(12) United States Patent
Katz

(10) Patent No.: US 7,938,412 B2
(45) Date of Patent: May 10, 2011

(54) TRANSPORTABLE CONTAINERS

(75) Inventor: Amir Katz, Bat-Heffer (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 0 days.

(21) Appl. No.: 12/861,700

(22) Filed: Aug. 23, 2010

(65) Prior Publication Data

US 2010/0314856 A1 Dec. 16, 2010

Related U.S. Application Data

(63) Continuation of application No. 11/441,051, filed on May 26, 2006, now Pat. No. 7,845,653.

(51) Int. Cl.
 *B62B 3/00* (2006.01)
 *B62B 1/00* (2006.01)
 *B65D 21/00* (2006.01)
 *B65D 43/18* (2006.01)

(52) U.S. Cl. ............ 280/47.34; 280/638; 280/639; 280/38; 280/47.131; 280/654; 312/325; 312/298; 206/741; 206/742; 206/748; 206/507; 220/4.22; 220/4.27; 220/522; 220/524; 220/254.2; 220/254.3; 220/255; 220/259.2

(58) Field of Classification Search ............ 280/47.34, 280/47.35, 47.371, 63, 64, 79.11, 79.2, 638, 280/35, 639, 37, 38, 641, 651, 652, 654, 280/659, 43.24, 47.131, 47.24, 47.27, 47.19; 312/294, 249.8, 249.9, 314, 281, 290, 309, 312/317.1, 317.2, 317.3, 298, 319.1, 319.2, 312/325; 206/741, 742, 745, 747, 748, 755, 206/45.24, 286, 287, 287.1, 507; 220/579, 220/4.07, 4.21, 4.22, 4.26, 4.27, 23.86, 505, 220/520, 522, 523, 524, 253, 254.1, 254.2, 254.3, 255, 259.2
See application file for complete search history.

(56) References Cited

U.S. PATENT DOCUMENTS 1,893,526 A 1/1933 Shriver
(Continued)

FOREIGN PATENT DOCUMENTS

DE 2 852 739 6/1979
(Continued)

OTHER PUBLICATIONS

Extended European Search Report as issued for EP Patent Application No. 09154771.1, dated Apr. 20, 2009.
(Continued)

*Primary Examiner* — Hau V Phan
*Assistant Examiner* — John R Olszewski
(74) *Attorney, Agent, or Firm* — Pillsbury Winthrop Shaw Pittman LLP

(57) ABSTRACT

A container assembly is provided that includes a base container that has an upper opening and an upper container mounted in covering relation over the upper opening of the base container. A linkage connects the upper container to the base container in a manner that allows the upper container to be displaced from the covering relation over the upper opening of the base container, so as to permit access into the base container through the upper opening. A support assembly is spaced from the base container when the upper container is displaced from the covering relation over the upper opening of the base container and wheels are disposed toward a lower portion of the container assembly. A handle is provided for rollingly transporting the container assembly on the wheels in a tilted configuration.

20 Claims, 9 Drawing Sheets

U.S. PATENT DOCUMENTS

| | | | |
|---|---|---|---|
| 1,992,435 A * | 2/1935 | Labadie et al. | 190/17 |
| D141,929 S | 7/1945 | Evans | |
| 2,747,388 A * | 5/1956 | Dolar | 220/524 |
| 3,383,058 A | 5/1968 | Slayton | |
| D222,933 S | 2/1972 | Brown | |
| 3,995,926 A | 12/1976 | Kessler, Sr. | |
| 4,466,628 A | 8/1984 | Zerver | |
| 4,739,577 A | 4/1988 | Lanius | |
| 4,820,003 A | 4/1989 | Lloyd | |
| 4,887,837 A | 12/1989 | Bonewicz, Jr. et al. | |
| 5,207,723 A | 5/1993 | Newby, Sr. | |
| 5,240,264 A | 8/1993 | Williams | |
| 5,285,656 A | 2/1994 | Peters | |
| D349,989 S | 8/1994 | Shetterly | |
| 5,333,408 A | 8/1994 | Simmons | |
| 5,378,005 A | 1/1995 | Norton | |
| 5,452,908 A | 9/1995 | Bencic | |
| D371,663 S | 7/1996 | Muller-Deisig et al. | |
| 5,595,395 A | 1/1997 | Wilson | |
| D395,108 S | 6/1998 | Pool | |
| 5,893,572 A | 4/1999 | Parks | |
| 5,988,657 A | 11/1999 | Henkel | |
| 6,176,559 B1 | 1/2001 | Tiramani et al. | |
| D437,484 S | 2/2001 | Tiramani et al. | |
| 6,209,977 B1 * | 4/2001 | Vondrejs | 312/294 |
| 6,347,847 B1 | 2/2002 | Tiramani et al. | |
| D462,170 S | 9/2002 | Chen et al. | |
| 6,601,930 B2 | 8/2003 | Tiramani et al. | |
| 6,761,366 B1 | 7/2004 | Klemmensen et al. | |
| 6,802,409 B1 | 10/2004 | Tiramani et al. | |
| 6,832,689 B2 | 12/2004 | Cho | |
| 6,910,560 B2 | 6/2005 | Dulin | |
| 6,923,352 B2 * | 8/2005 | Oh | 224/153 |
| 7,111,852 B2 | 9/2006 | Woods et al. | |
| 7,278,234 B2 | 10/2007 | Marino | |
| 7,306,245 B1 | 12/2007 | Lowe | |
| 7,488,048 B2 | 2/2009 | Paganini | |
| 2006/0021985 A1 | 2/2006 | Jasper | |
| 2006/0124643 A1 | 6/2006 | Markert et al. | |
| 2007/0273114 A1 | 11/2007 | Katz | |

FOREIGN PATENT DOCUMENTS

| | | |
|---|---|---|
| DE | 8 519 449 | 9/1985 |
| DE | 3 510 307 | 9/1986 |
| DE | 3 911 096 | 10/1989 |
| EP | 1 724 069 A2 | 11/2006 |
| FR | 1 240 874 | 9/1960 |
| FR | 1 264 534 | 6/1961 |
| GB | 938 456 | 10/1963 |
| GB | 2 298 190 | 8/1996 |
| GB | 2 315 480 | 2/1998 |
| WO | WO 2008/090546 | 7/2008 |

OTHER PUBLICATIONS

European Search Report issued for EP Patent Application No. 07252097.6-2425, dated Sep. 7, 2007.

* cited by examiner

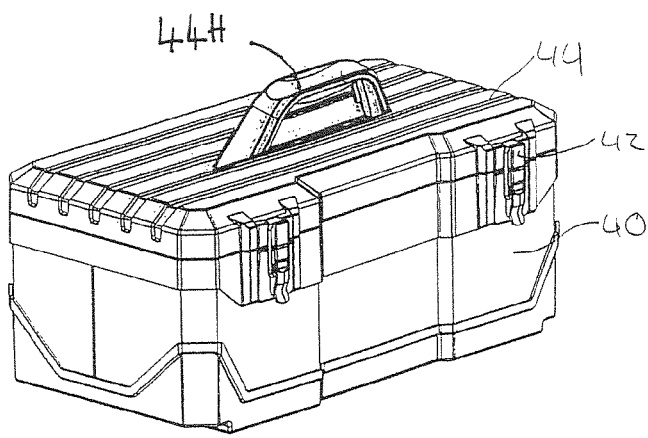
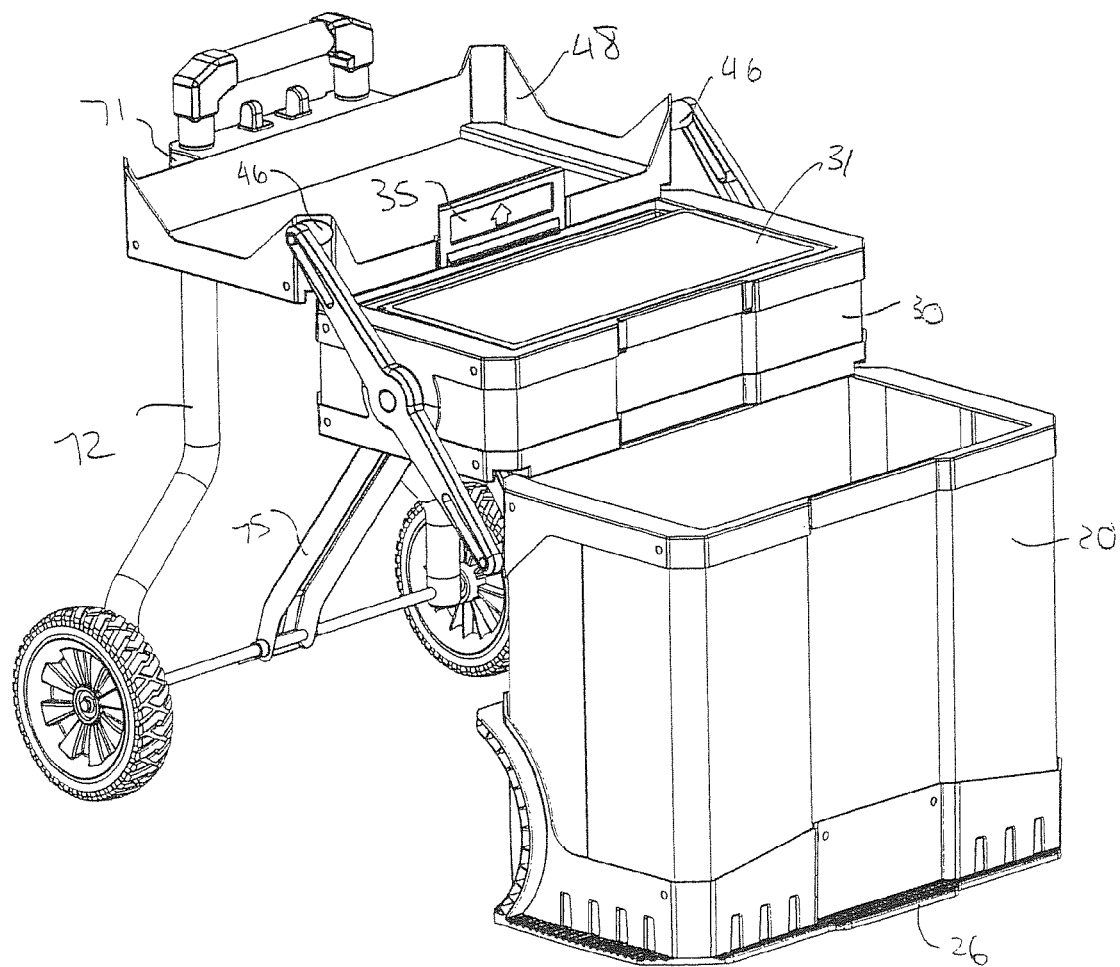
FIG. 6

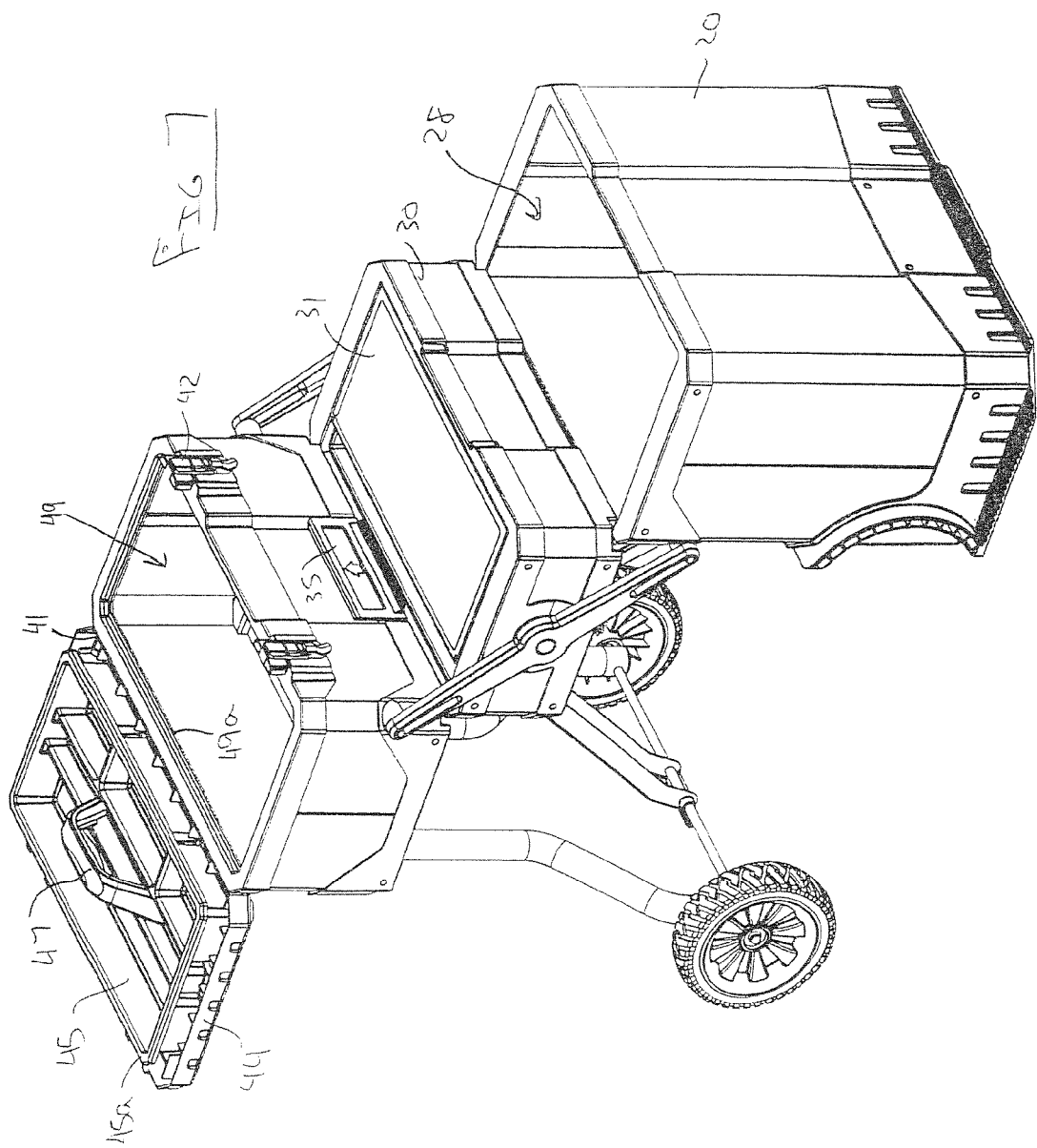

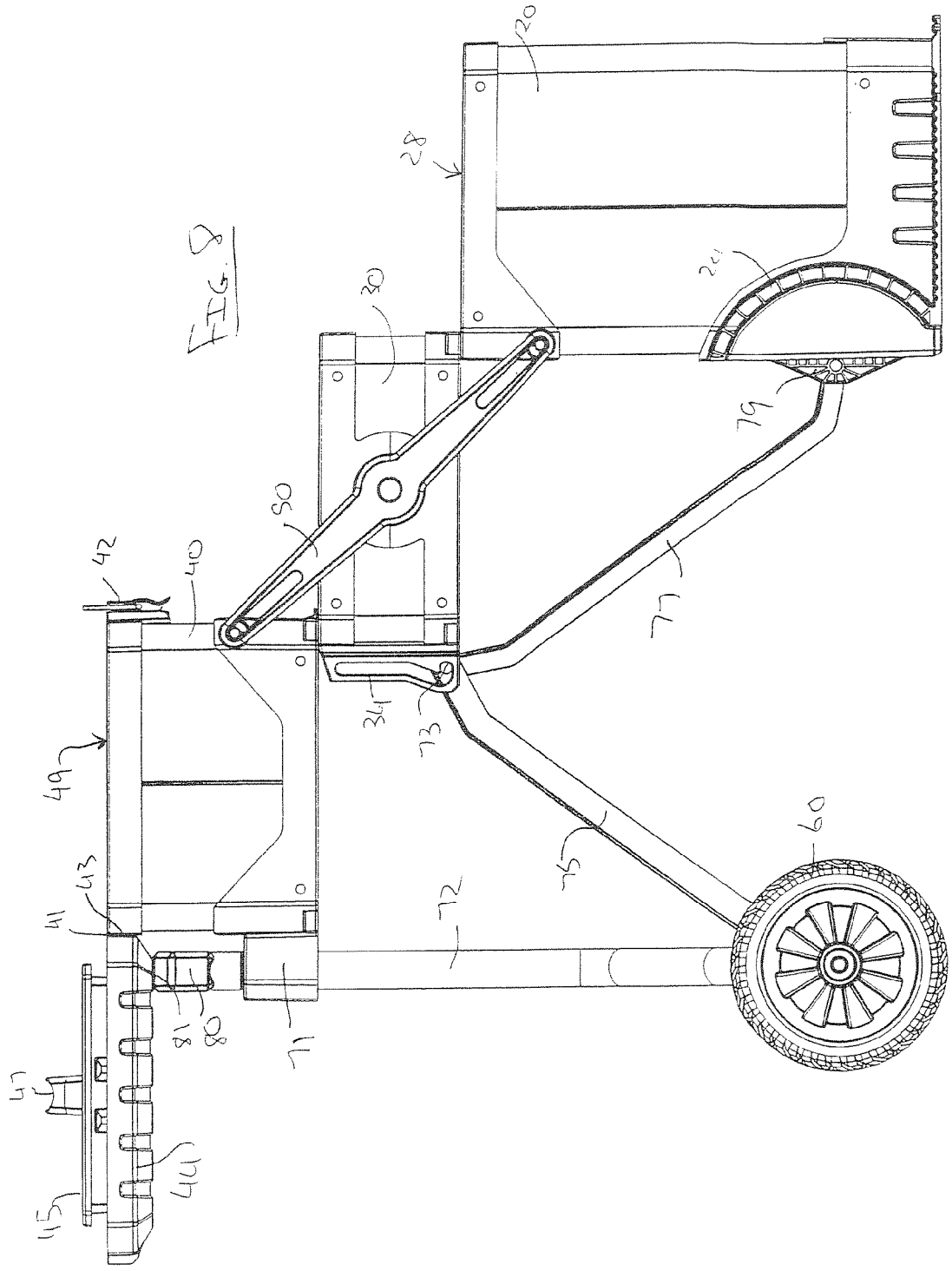

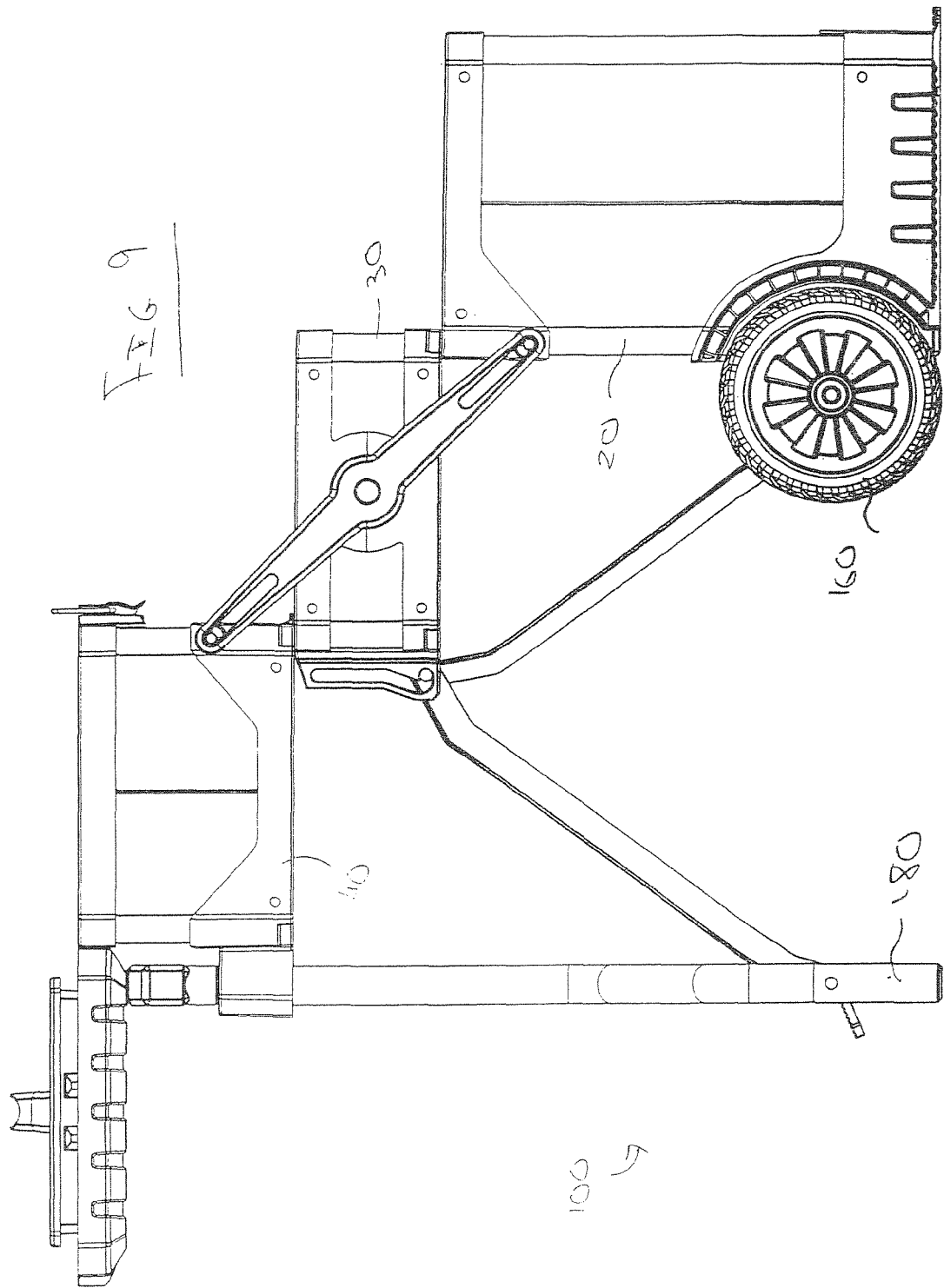

TRANSPORTABLE CONTAINERS

CROSS REFERENCE TO RELATED APPLICATIONS

This application is a continuation of U.S. patent application Ser. No. 11/441,051, filed May 26, 2006, entitled "Transportable Containers," the contents of which are incorporated herein by reference in their entirety.

FIELD OF THE INVENTION

The present invention relates to container assemblies and, more particularly, to rolling container assemblies expandable from a compact configuration to an expanded configuration.

BACKGROUND OF THE INVENTION

Numerous container assemblies are known in the art. However, there is a constant need in the industry to improve upon existing container assemblies by making them more efficient, space reducing, mobile, and/or multi-functional.

SUMMARY OF THE INVENTION

A container assembly is provided that includes a base container that has an upper opening and an upper container mounted in covering relation over the upper opening of the base container. A linkage connects the upper container to the base container in a manner that allows the upper container to be displaced from the covering relation over the upper opening of the base container, so as to permit access into the base container through the upper opening. A support assembly is spaced from the base container when the upper container is displaced from the covering relation over the upper opening of the base container and wheels are disposed toward a lower portion of the container assembly. A handle is provided for rollingly transporting the container assembly on the wheels in a tilted configuration.

BRIEF DESCRIPTION OF THE DRAWINGS

The above-mentioned and other features and advantages of the present invention, and the manner of attaining them, will become more apparent and the disclosure itself will be better understood by reference to the following description taken in conjunction with the accompanying drawings, wherein:

FIG. 6 is a perspective front view of a rolling container assembly in an expanded configuration including a removable top container, in accordance with an embodiment of the present invention;

FIG. 7 is a perspective front view of a rolling container assembly in an expanded configuration including a pivotable top cover, in accordance with an embodiment of the present invention;

FIG. 8 is a side view of a rolling container assembly in an expanded configuration including a pivotable top cover, in accordance with an embodiment of the present invention; and FIG. 9 is a side view of a rolling container assembly in an expanded configuration with wheels mounted to the base container, in accordance with an embodiment of the present invention.

Figure 1:
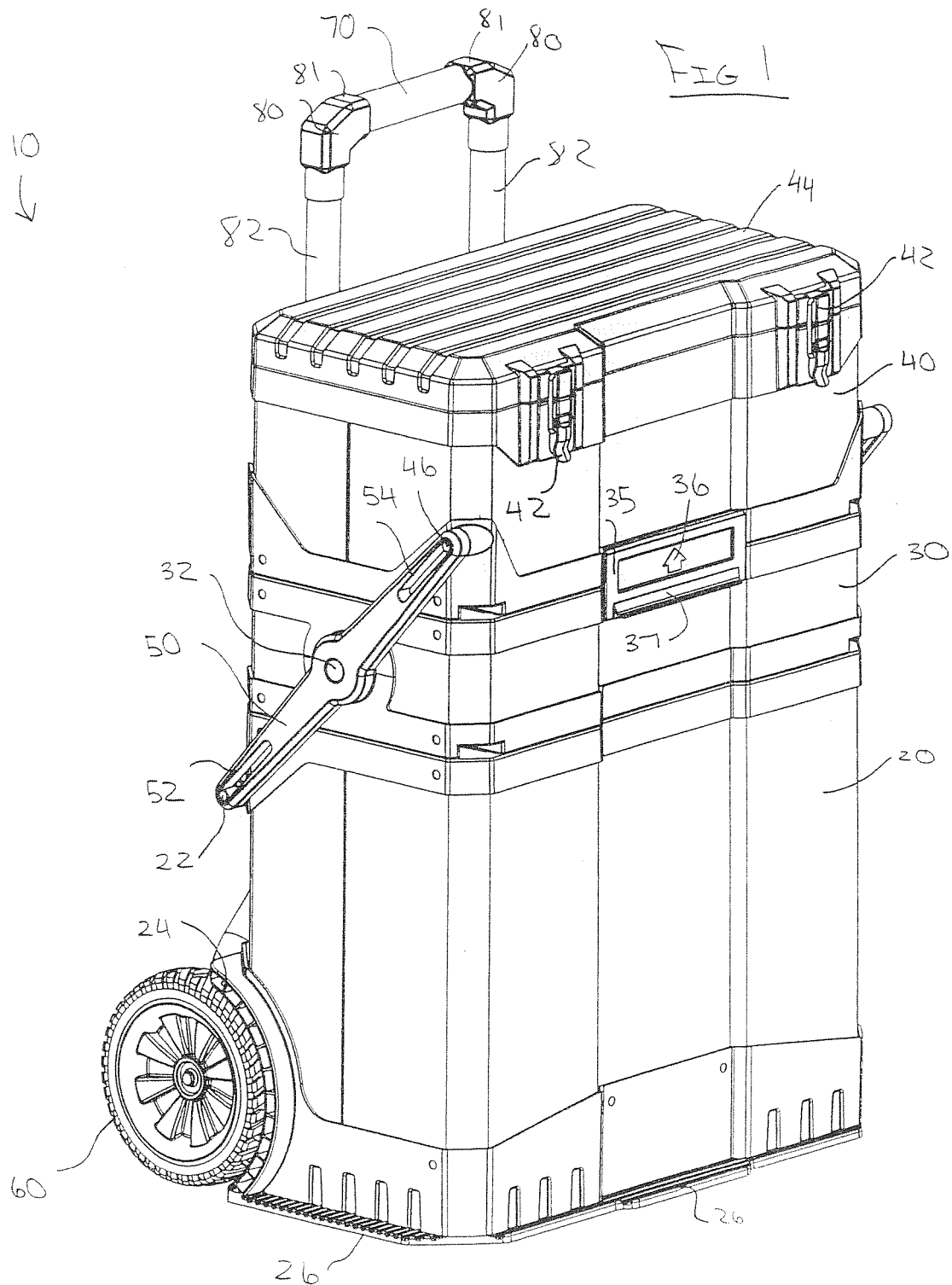
FIG. 1 is a perspective front view of a rolling container assembly in a compact configuration, in accordance with an embodiment of the present invention.

The present invention will be described with reference to the accompanying drawings. Corresponding reference characters indicate corresponding parts throughout the several views. The description as set out herein illustrates an arrangement of the invention and is not to be construed as limiting the scope of the disclosure in any manner.

DETAILED DESCRIPTION OF THE INVENTION

Figure 2:
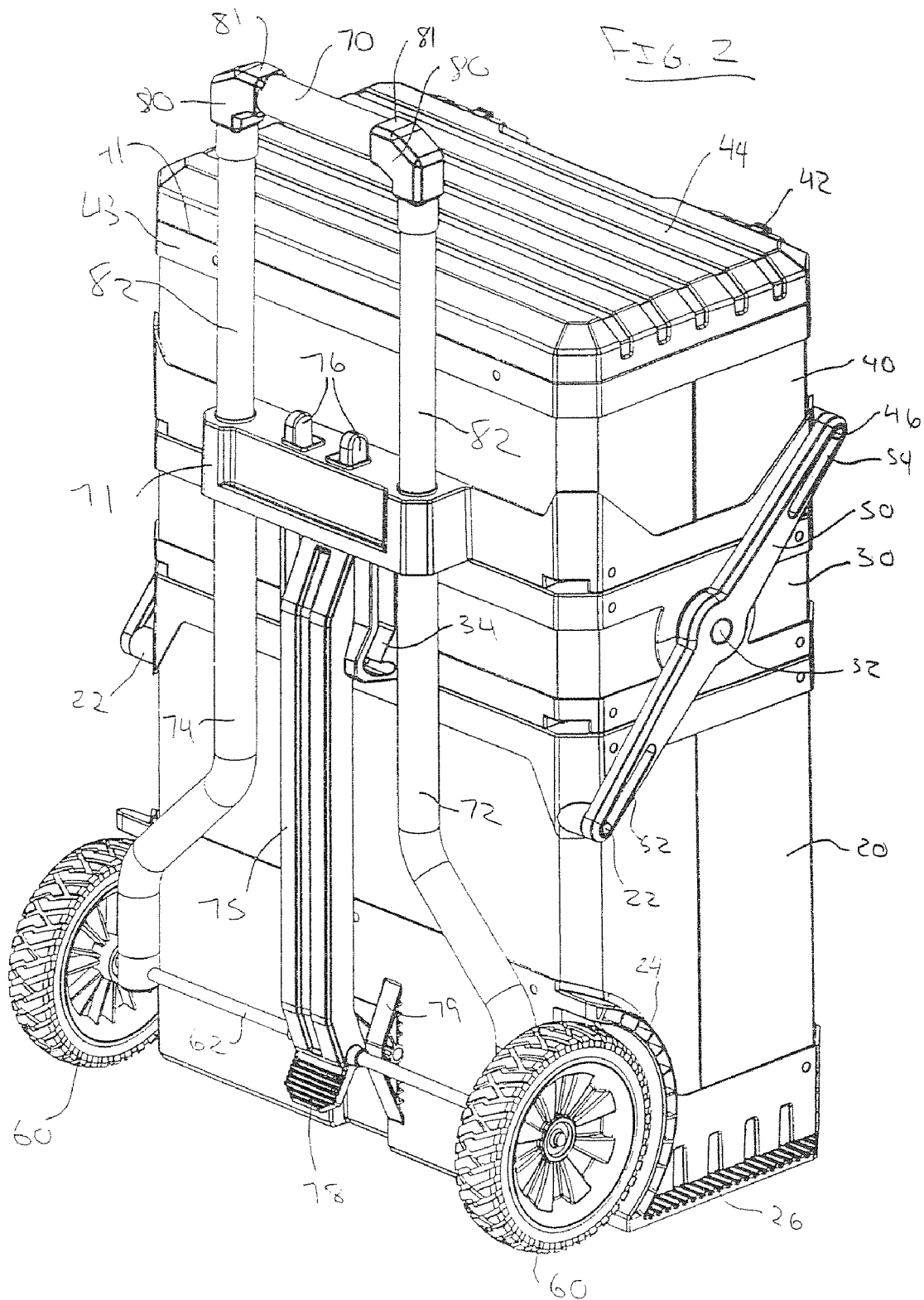
FIG. 2 is a perspective rear view of a rolling container assembly in a compact configuration, in accordance with an embodiment of the present invention.

A rolling container assembly 10 in accordance with the present invention is shown in FIG. 1. The assembly 10 generally includes a base container 20, an upper container 30, and a top container 40. A support assembly primarily including a handle 70, a right support leg 72, a left support leg 74, support linkages 75, 77, and wheels 60 provide support for the container assembly 10 and allow for relative movement between the base container 20, the upper container 30, and the top container 40. The assembly 10 may be arranged in a compact configuration, as shown in FIGS. 1-2, or the assembly 10 may be arranged in an expanded configuration, as shown in FIGS. 3-9. A linkage 50 is mounted to suitable locations on two sides of each of the base container 20, the upper container 30, and the top container 40 to aid in permitting expansion of the assembly 10 from the compact configuration to the expanded configuration. The base container 20, the upper container 30, or the top container 40 may contain trays, such as toolbox trays, to aid in organizing and maximizing the space within the interior of any of the containers 20, 30, 40.

Wheels 60 are mounted in proximity to a lower region of the base container 20 so that the assembly 10 may be tilted and pushed along the ground by a user holding a handle 70. Alternatively, more than two wheels 60 may be mounted to a base region of the assembly 10 such that the assembly 10 need not be tilted to be moved. The assembly 10 may be capable of being moved in either the compact configuration or the expanded configuration. In one embodiment, the wheels 60 are mounted to the lower part of the support legs 72, 74 such that the container assembly 10 may be moved by tilting it back by pulling on the handle 70 and rolling the assembly on the wheels 60.

In another embodiment of a rolling container assembly 100, shown in FIG. 9, wheels 160 may be mounted directly to the base container 20. This arrangement may be advantageous, for example, when the assembly 100 is being expanded or when the base container 20 contains a heavy load. In the embodiment shown in FIG. 9, the right support leg 72 and the left support leg 74 are provided with ground-engaging posts 180 to provide adequate support when the wheels 160 are moved along with the base container 20. The posts 180 may be configured to be foldable upward or outward when the assembly 100 is in the compact configuration so as to allow the wheels 160 to contact the ground.

Figure 3:
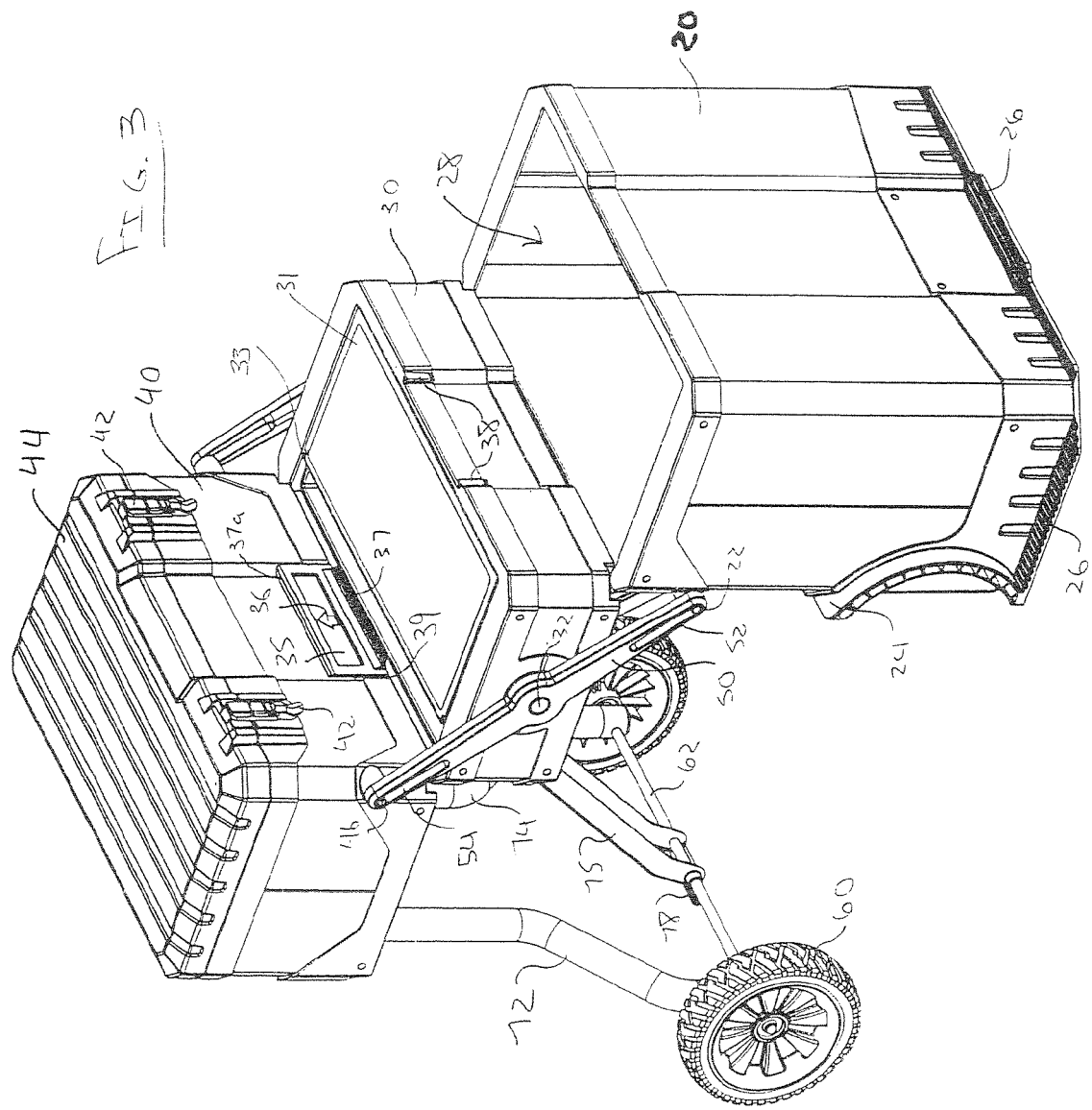
FIG. 3 is a perspective front view of a rolling container assembly in an expanded configuration, in accordance with an embodiment of the present invention.

The base container 20 includes an upper opening 28 through which access to the inside of the base container 20 is provided, as shown in FIG. 3. The base container 20 houses a space within to accommodate any of a variety of items including, but not limited to, tools, hardware, parts, etc. In the compact configuration, the upper opening 28 may be covered by the upper container 30. In the expanded configuration, the upper container 30 is displaced such that the upper opening 28 of the base container 20 may be accessible. It should be appreciated that in some embodiments, displacement of the upper container may reveal a removable upper tray or other removable structure that covers the upper opening 28. Nevertheless, such a configuration still permits "access" into the base container 20 through the upper opening 28 of the base container 20 as contemplated herein. The base container 20 may further be provided with an arcuate cut-out 24 on each side thereof that is configured to receive each of the wheels 60. A ground-engaging surface 26 is provided on the bottom surface of the base container 20 to reduce wear to the assembly 10 from repeated contact with the ground. The ground-engaging surface 26 may be made of a hard or durable rubber, plastic, metal, or other suitable material. A lower linkage stud 22 may be mounted on each of the sides of the base container 20 for engagement with the linkages 50 to enable expansion of the assembly 10, as will be discussed below.

The upper container 30 may be located above the base container 20 such that it covers the opening 28 when the assembly 10 is in the compact configuration and permits access to the opening 28 when the assembly 10 is in the expanded configuration. The upper container 30 may include a pivot 32 on each of its sides that secures the linkage 50 to the assembly 10 and permits the linkage 50 to rotate about the pivot 32. The upper container 30 houses a space within to accommodate any of a variety of items including, but not limited to, tools, hardware, parts, etc. The upper container 30 may also be provided with a cover 31 that can be pivotable about hinge 33 to enclose the contents of the upper container 30. The upper container 30 further includes a pair of lower rails 38 at an upper region of a front face that interact with a locking plate 35 to prevent expansion of the assembly 10, as discussed below.

The top container 40 is located above the upper container 30. The top container 40 includes an upper linkage stud 46 on each of its sides for engagement with linkages 50 to enable expansion of the assembly 10, as discussed below. Similarly to the base container 20 and the upper container 30, the top container 40 houses an internal space 49 suitable for accommodating any of a variety of items including, but not limited to, tools, hardware, parts, etc. The locking plate 35 is located at a lower region of a front face of the top container 40 and is slidingly received by upper rails 39 for, in conjunction with lower rails 38, preventing or enabling relative displacement between each of the containers 20, 30, 40, as discussed below.

It should be appreciated that the top container 40 may also be considered as the "upper container" that covers the upper opening of the base container 20. Thus, the present invention contemplates that there may be intervening structure between the "upper container" and the "base container" as contemplated herein (e.g., also see discussion above regarding the removable tray covering the base container upper opening 28).

The top container 40 may include a pivotable top cover 44 to permit access to its interior space 49. The top cover 44 may be secured in a closed position as shown in FIG. 1 by latches 42. By releasing the latches 42, the top cover 44 may then be pivoted about a hinge 41 to an open position as shown in FIGS. 7-9 (the handle 70 is movable from a first, raised, position as shown in FIGS. 1-2 to a second, lowered, position as shown in FIGS. 4-9, allowing opening clearance for the top cover 44, and is discussed in detail below). In the open position, the top cover 44 may be supported to lay flat such that the top cover 44 is usable as a table or tray. Support for the top cover 44 in the vertical force direction is provided by stop surfaces 81 formed on joints 80 associated with the support legs 72, 74 and handle 70. Support for the top cover 44 in the horizontal force direction is provided by the stop surface 43, which may be located along an, upper region of the top container 40, as shown in FIG. 8.

When the top cover 44 is in the open position, it may be configured to receive a tray 45, which may have a handle 47, as shown in FIGS. 7-8. The tray 45 has a lip 45a that may ordinarily be received by the ledge 49a disposed about the periphery of an upper region of the internal space 49 of the top container. Thus, the top cover 44 may include a recess to receive the tray 45 and provide a convenient location to place the tray 45 after it is removed from the top container 40 when accessing objects within the space 49.

In one embodiment, the top container 40 may be configured to be removable from the rolling container assembly 10. As shown in FIG. 6, the top container 40 may be seated in a base frame 48 that includes the upper linkage studs 46 and locking plate 35. In this embodiment, the upper linkage studs 46 attach the base frame 48 to the upper container 30 and the base container 20 via the linkage 50, and a bracket 71 attaches the base frame 48 to the support legs 72, 74. Thus, in this embodiment, any elements that were described as being attached the top container 40 to the container assembly 10 in the previously described embodiment (in which the top container 40 is not removed) are located on the base frame 48, freeing the top container 40 for removal from the container assembly 10 as shown in FIG. 6. The top cover 44 may be provided with a handle 44H on its top surface to aid in removing the top container 40 from the base frame 48. Although not shown, the container assembly 10 may include means to lock the top container 40 in its seated position on the base frame 48. Such locking means may be incorporated into the locking plate 35, mechanism or may comprise a separate locking mechanism, such as latches located on the base frame 48.

The rolling container assembly 10 of the present invention includes a support assembly that supports, controls, and guides the assembly 10 during expansion and compaction and in each of its final and transient positions. The assembly 10 further includes a handle 70, which includes right and left extension legs 82, that enables a user to maneuver the assembly 10.

Figure 4:
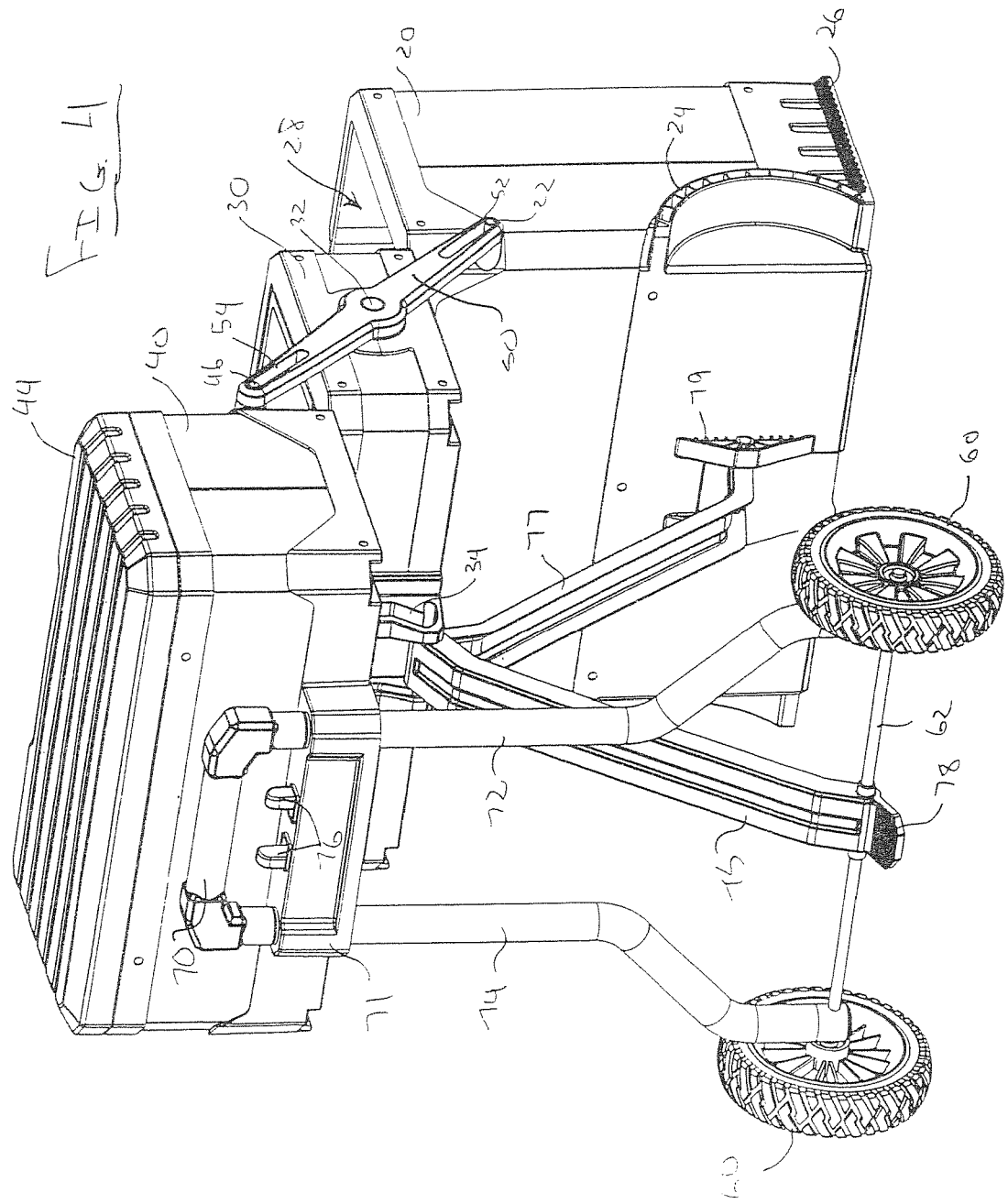
FIG. 4 is a perspective rear view of a rolling container assembly in an expanded configuration, in accordance with an embodiment of the present invention.
Figure 5:
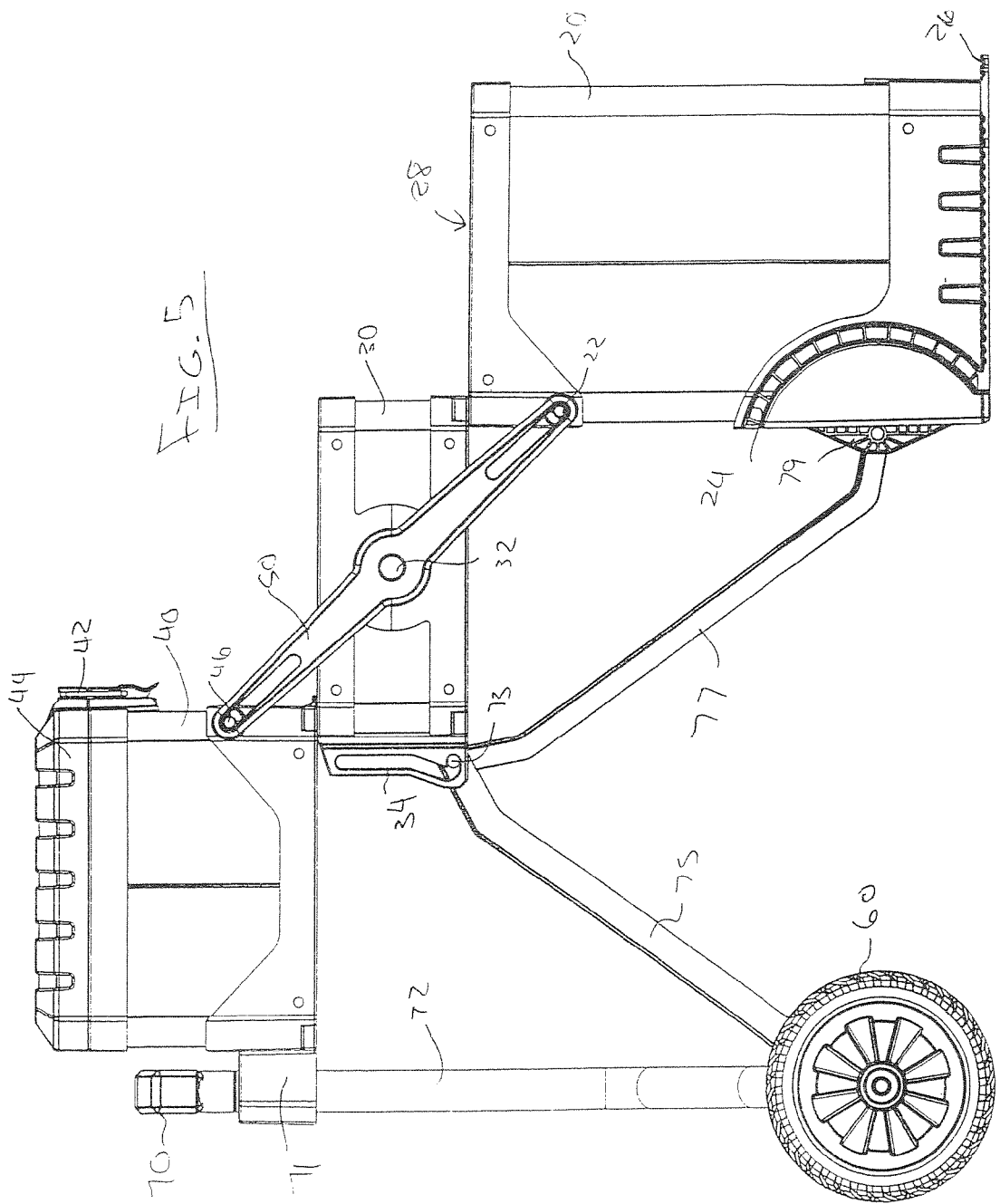
FIG. 5 is a side view of a rolling container assembly in an expanded configuration, in accordance with an embodiment of the present invention.

In one, non-limiting example, the support assembly generally includes right support leg 72, left support leg 74, bracket 71, extension links 75, 77, and guide channel 34. It should be appreciated that numerous arrangements for a support assembly to support the containers when in an expanded cantilevered configuration can be provided. The bracket 71 is secured to the top container 40 (or, in the alternative embodiment discussed above, the base frame 48) and the support legs 72, 74 extend from the bracket 71 to a wheel axle 62. Extension links 75, 77 are provided to control and guide the movement of the containers 20, 30, 40 during expansion and in each of the positions. The extension link 75 extends from the wheel axle 62 to the guide channel 34, as shown in FIGS. 2, 4, and 5. The extension link 75 has at one end a guide pin 73 that is configured and sized to follow guide channel 34, thus allowing the extension link 75 to pivot about the guide pin 73 while riding the guide channel 34. The extension link 75 may further include a foot pad 78 at an end connected to the wheel axle 62 to assist a user in tilting the assembly 10 when it is desired to be moved. The second extension link 77 is pivotally connected at one end to the guide pin 73 and is pivotally connected at another end to a bracket 79 that is secured to the base container 20. When the container assembly 10 is in the compact configuration as shown in FIG. 2, the second extension link 77 may be sized to fit within the first extension link 75 as shown in order to minimize space occupied by the links 75, 77.

When the container assembly 10 is in the compact configuration, as shown in FIG. 2, each of the extension links 75, 77 are oriented vertically and the guide pin 73 is at the top end of the guide channel 34. As the assembly transitions to the expanded configuration, shown in FIGS. 4-5, the extension links 75, 77 begin to spread out and the guide pin 73 begins to travel downward in the guide channel 34. When the final expanded position is reached, the extension links 75, 77 are oriented at approximately forty-five degree angles with the ground and provide sufficient strength to the assembly 10 by forming trusses with the support legs 72, 74 and the containers 20, 30, 40. The guide pin 73 is at the bottom end of the guide channel 34.

When the container assembly 10 is in its expanded configuration (i.e., the upper container 30 is displaced from covering relation to the base container 20) the support assembly is spaced from the base container 20 to better support the cantilevered arrangement of the upper container 30. This is not to say, however, that the support assembly is not spaced from the base container 20 when the container assembly 10 is in the compact configuration. Indeed, in some embodiments, some spacing may be desirable in the compact condition for a larger support footprint.

The handle 70 is movable between a range of positions having an upper limit, as shown in FIG. 2, and a lower limit, as shown in FIG. 4. The support legs 72, 74 are configured to telescopically receive the extension legs 82 of the handle 70 to enable such lowering and extension. The bracket 71 includes tabs 76 to lock and release the extension legs 82 from a locking mechanism located within or around the bracket 71. To move the handle 70 up or down, a user squeezes the two tabs 76 together to release the extension legs 82 from the locking mechanism. The locking mechanism may be any suitable mechanism known in the art to restrict movement of a telescopically received tube or rod, such as a tension grip, notch and catch, etc. The tabs 76 may alternatively be some other release mechanism, such as a button, a single tab, etc.

When the rolling container assembly 10 is in the compact configuration of FIGS. 1-2 and is desired to be moved, the handle 70 is preferably in an extended position. When the rolling container assembly 10 is in the expanded configuration of FIGS. 4-9, the handle 70 is preferably in the lowered, non-extended position so that the top cover 44 of the top container 40 can be held in an open position and supported by a stop surface 81 located on the joints 80 of the handle 70, as shown in FIGS. 7-8.

It is appreciated that the upper limit of extension for the handle 70 shown in FIGS. 1-2 is merely exemplary and should not be understood to represent a maximum distance of extension. For example, the extension legs 82 of the handle 70 may be made up of several series of telescoping tubes such that the handle 70 can be extended beyond what is depicted in Figures.

The rolling container assembly 10 includes linkages 50 on each side of the assembly 10 in order to maintain relative positions between the containers 20, 30, 40 and to limit movement of the containers 20, 30, 40. The linkages 50 are attached to the upper container 30 at pivot 32 such that the linkage 50 rotates about the pivot 32. With respect to the linkage 50 as shown in FIGS. 2 and 5 that is on the right side of the container assembly 10, the linkage 50 will rotate counter-clockwise when the assembly 10 moves from a compact configuration (FIG. 2) to an expanded configuration (FIG. 5) and will rotate clockwise when the assembly 10 moves from the expanded configuration (FIG. 5) to the compact configuration (FIG. 2). Naturally, the linkage 50 that is on the left side of the assembly (not shown) will rotate in opposite directions when viewed from that side.

The linkage includes lower slot 52 and upper slot 54 that receive the lower linkage stud 22 and the upper linkage stud 46, respectively. In the compact configuration of the container assembly 10 shown in FIGS. 1-2, the linkage 50 is diagonally oriented, and linkage studs 22, 46 are each at the respective ends of the slots 52, 54 that are farthest from the pivot 32. Midway through the transition to the expanded configuration (not shown), the linkage 50 will have rotated to a generally vertical orientation and the linkage studs 22, 46 will have moved inward along the slots 52, 54, toward the pivot 32. When the assembly 10 has reached its final position in the expanded configuration, as shown in FIG. 5, the linkage 50 will have rotated to a diagonal orientation, approximately ninety degrees from the diagonal orientation of the linkage when in the compact configuration, and the linkage studs 22, 46 will have once again reached the ends of the slots 52, 54 farthest from the pivot 32. Further displacement of the containers is thereby prevented by virtue of the linkage studs 22, 46 reaching the ends of the slots 52, 54 as well as the guide pin 73 reaching the end of the guide channel 34. During expansion or compaction, the linkage 50 thus maintains the relative displacement between each pair of adjacent containers 20, 30, 40 to be constant. That is, if the base container 30 moves 6 inches relative to the upper container 20, for example, the linkage 50 assures that the upper container 40 moves 6 inches relative to the top container 30. This concerted action enables smooth operation of the container assembly 10. Further, a user need only apply a force to a single container, such as the base container 20, to effect expansion of the entire assembly 10.

The rails 38, located in an upper region of the upper container 30 as shown in FIG. 3, are configured to slidingly receive a locking plate 35, which has corresponding slots in its side edges to permit sliding along the rails 38 in the vertical direction (in the frame of reference of the Figures). In conjunction with a second set of rails 39 located at a lower region of the top container 40, the rails 38 on the upper container and the locking plate 35 lock the assembly 10 in the compact configuration shown in FIG. 1 and may be unlocked to permit expansion of the assembly 10 to the expanded configuration shown in FIGS. 4-9.

The locked position of the locking plate 35 is shown in FIG. 1. In this position the assembly 10 is prevented from being expanded because the locking plate 35 restricts lateral displacement between the upper container 30 and the top container 40. Because of the linkage 50 requiring concerted movement between the containers, the prevention of displacement between the upper container 30 and the top container 40 by the locking plate 35 necessarily prevents displacement between any of the containers 20, 30, 40.

When it is desired to move the assembly 10 to the expanded configuration, a user may move the locking plate 35 upwards by pulling upward on the surface 37 of the locking plate 35 until it has cleared the rails 38 on the upper container 30. The locking plate 35 may have structure that engages with corresponding structure on the rails 39 on the top container 40 to prevent the locking plate 35 from becoming dislodged from the rails 39 or from sliding upward more than necessary, as one of skill in the art will appreciate.

Once the locking plate 35 has cleared the rails 38, the assembly 10 is free to be transitioned to the expanded configuration. A user may then pull the base container 20 outward from the support legs 72, 74, which in turn displaces the upper container, so that the upper opening 28 of the base container is fully accessible and the cover 31 of the upper container 30 may be pivoted so as to allow access to an internal space of the upper container 30.

To return the assembly 10 to the compact configuration, a user may simply push the base container 20 inward toward the support legs 72, 74 and then push the locking plate 35 downward to lock the upper container 30 and the top container 40 together. The locking plate 35 may have a top surface 37a to provide an adequate surface area for engagement by the user. The locking plate 35 may further have structure that engages with corresponding structure on the upper rails 39 or lower rails 38 in order to prevent the locking plate 35 from being pushed too far, as will be appreciated by one having skill in the art.

While specific embodiments have been described above, it will be appreciated that the invention may be practiced otherwise than as described. The descriptions above are intended to be illustrative and not limiting. Thus it will be apparent to one skilled in the art that modifications may be made to the invention as described without departing from the scope of the claims set out below.

What is claimed is:

1. A container assembly, comprising:
   a base container having an upper opening;
   an upper container mounted above said upper opening of said base container, the upper container having an upper opening and a pivotable top cover, the pivotable top cover arranged to selectively permit or prevent access to an interior space of the upper container through the upper opening thereof;
   a releasable latch arranged to lock the top cover in a closed position;
   a linkage configured to enable the container assembly to be moved between an expanded configuration and a compact configuration, wherein in the expanded configuration said upper container a) remains elevated relative to the base container but is displaced from being positioned above said upper opening of said base container and b) access into said base container through said upper opening is permitted;
   a support assembly configured to be moved away from the base container when the container assembly is moved from the compact configuration to the expanded configuration;
   wheels disposed toward a lower portion of said container assembly; and
   a handle positioned and configured relative to the container assembly to enable tilting of the container assembly, and rolling transport of the container assembly on said wheels in a tilted configuration, the handle and the wheels being located on a same side of the container assembly to facilitate tilted rolling movement of the container assembly.

2. The container assembly according to claim 1, further comprising an intervening container disposed between the base container and the upper container, wherein said linkage is connected to said intervening container in a manner that allows said intervening container to be displaced from covering relation over the base container when the container assembly is in the expanded configuration.

3. The container assembly according to claim 2, wherein said intervening container has an upper opening covered by said upper container when the container assembly is in the compact configuration.

4. The container assembly according to claim 1, wherein said wheels are mounted on the support assembly.

5. The container assembly according to claim 1, wherein said wheels are mounted on the base container.

6. The container assembly according to claim 1, wherein said support assembly is operatively connected with said upper container so as to be automatically moved from a position adjacent to said base container when the container assembly is in the compact configuration to the position spaced from the base container when the container assembly is in the expanded configuration.

7. The container assembly of claim 1, wherein the support assembly must be manually moved from a position adjacent to said base container to the position spaced from the base container.

8. The container assembly of claim 1, wherein the top cover has a handle, and the upper container can be disconnected from said linkage and separately transported via said handle.

9. The container assembly according to claim 1, wherein the top cover has an opening stop surface that engages a cooperating stop surface on the upper container when the cover is pivoted to an open position, so that when pivoted to an open position, said cover is disposed in a horizontal, cantilevered position.

10. The container assembly according to claim 9, further comprising a tray, said tray being movable from a position at which it is disposed at the upper opening in the top container to a position in which it is received in a recess in an underside of the cover when the cover is in the horizontal, cantilevered position.

11. The container assembly according to claim 1, wherein the linkage is rotatably connected to said upper container.

12. The container assembly according to claim 1, wherein said linkage includes an arm with an elongated configuration.

13. The container assembly according to claim 1, wherein said linkage remains coupled to a same location of said base container as said upper container is displaced from being positioned above said upper opening of said base container.

14. The container assembly according to claim 1, wherein the linkage restricts relative movement between the base container and the upper container to linear movement.

15. The container assembly according to claim 1, wherein the support assembly is adjacent to the base container when the container assembly is in the compact configuration.

16. The container assembly according to claim 1, wherein the support assembly is closer to the base container when the container assembly is in the compact configuration in comparison to the expanded configuration.

17. The container assembly according to claim 1, further comprising a releasable latch configured to latch the container assembly in the compact configuration, the latch being releasable to enable the container assembly to be moved to the expanded configuration, the latch being actuatable without requiring movement of the handle.

18. The container assembly according to claim 1, wherein said base container has a bottom comprising a non-rotatable ground engaging surface for contacting the ground to support said container assembly.

19. The container assembly according to claim 1, wherein in the compact configuration, the upper container is in covering relation over the base container, and wherein the support assembly is adjacent to the base container when the upper container is in said covering relation over said upper opening of said base container.

20. The container assembly according to claim 1, wherein in the compact configuration, the upper container is in covering relation over the base container, and wherein the support assembly is closer to the base container when the upper container is in said covering relation over said upper opening of said base container in comparison to when the upper container is displaced from said covering relation over said upper opening of said base container.

* * * * *